United States Patent
Whitehorn

[11] 3,710,635
[45] Jan. 16, 1973

[54] HARMONIC DIFFERENTIAL SPROCKET

[76] Inventor: Richard M. Whitehorn, 3023 Lakehaven Court, Ann Arbor, Mich. 48105

[22] Filed: Jan. 15, 1971

[21] Appl. No.: 106,830

[52] U.S. Cl. .............................. 74/243 R, 74/805
[51] Int. Cl. ................................. F16h 55/30
[58] Field of Search .................... 74/804, 805, 243 R

[56] References Cited

UNITED STATES PATENTS

| | | | |
|---|---|---|---|
| 3,307,434 | 3/1967 | Kope | 74/804 |
| 1,725,506 | 8/1929 | Carlson | 74/243 R |
| 3,160,032 | 12/1964 | Black | 74/804 |
| 3,383,931 | 5/1968 | Patterson, Jr. | 74/804 |

*Primary Examiner*—C. J. Husar
*Attorney*—McGlynn, Reising, Milton & Ethington

[57] ABSTRACT

A reduction drive assembly for driving a chain or circular drum having a plurality of circular roller elements and including a shaft having first and second opposite disposed offset eccentrics with the first gear movably mounted on the first eccentric and a second gear movably mounted on the second eccentric with the gears having guide holes therein and guide pins extending between a pair of plates and through the guide holes for controlling the relative rotation between the gears. The novelty in the assembly resides in the configuration of the periphery of the gears, i.e., the tooth shape, as defined mathematically in terms of x and y coordinates with the x and y axes passing through the center of the gear. The gears are also novel in that the guide holes extending through the gears are disposed on centers located relative to the crown of a gear tooth and the adjacent root or throat.

4 Claims, 6 Drawing Figures

PATENTED JAN 16 1973

3,710,635

INVENTOR.
Richard M. Whitehorn
BY
Barnard, McGlynn & Reising
ATTORNEYS

HARMONIC DIFFERENTIAL SPROCKET

The drive assembly of the instant invention is frequently utilized as a speed reduction drive assembly for converting a high rotational speed and relatively low torque to a low rotational speed and relatively high torque. There are various drive assemblies which accomplish this broad function, however, the instant invention is more specifically related to a drive assembly of the type having two gears movably supported on oppositely disposed eccentrics with the driven member engaging the circumference of the gears. Drive assemblies of this type are disclosed in the U.S. Pat. No. 3,145,585 to Brown and the U.S. Pat. No. 3,190,149 to Corfin.

It is always desirable that such assemblies translate uniform motion of an input member into uniform motion of an output member. In order to accomplish this it has been necessary that the gears in such an assembly be precisely manufactured to close tolerances. It is, of course, very difficult and expensive to manufacture the gears to such close tolerances and when the tolerances are not maintained, the drive assemblies do not function properly and in some cases are subject to jamming.

Accordingly, it is an object and feature of this invention to provide an improved drive assembly of this type for driving a driven member having a plurality of rollers and wherein the peripheral tooth configuration of the driving gears are such that the drive assembly is inherently tolerent of manufacturing errors.

In correlation with the foregoing object and feature, it is another object and feature of this invention to provide such a drive assembly wherein the periphery of the drive gears is defined mathematically in terms of $x$ and $y$ coordinates with the $x$ and $y$ axes passing through the center of the gear.

Other objects and attendant advantages of the present invention will be readily appreciated as the same becomes better understood by reference to the following detailed description when considered in connection with the accompanying drawings wherein.

Figure 1:
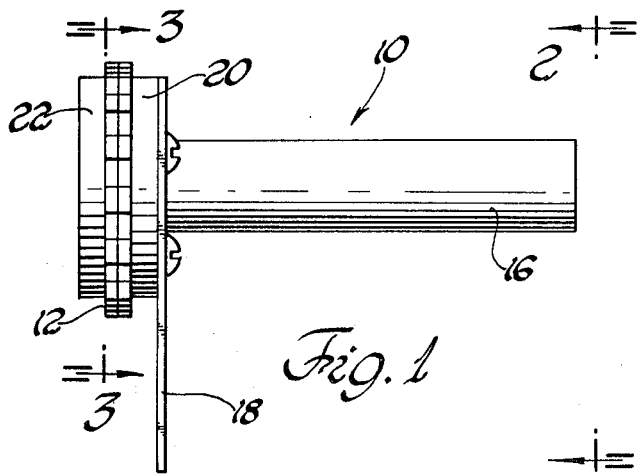
FIG. 1 is an elevation view of a preferred embodiment of the instant invention.
Figure 2:
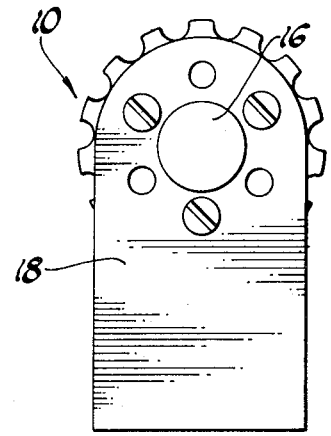
FIG. 2 is a view taken substantially along line 2—2 of FIG. 1.
Figure 3:
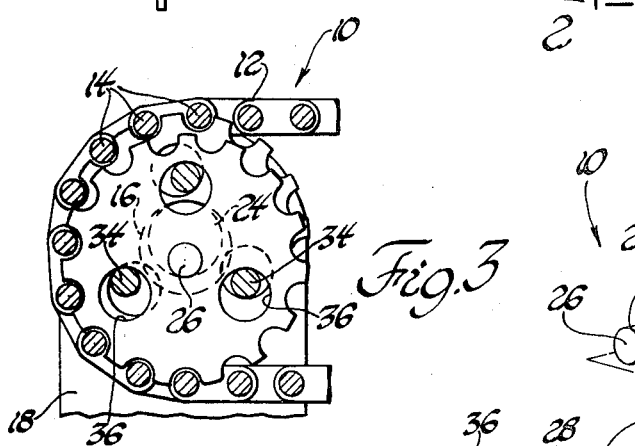
FIG. 3 is an enlarged fragmentary cross sectioned view taken substantially along line 3—3 of FIG. 1.
Figure 4:
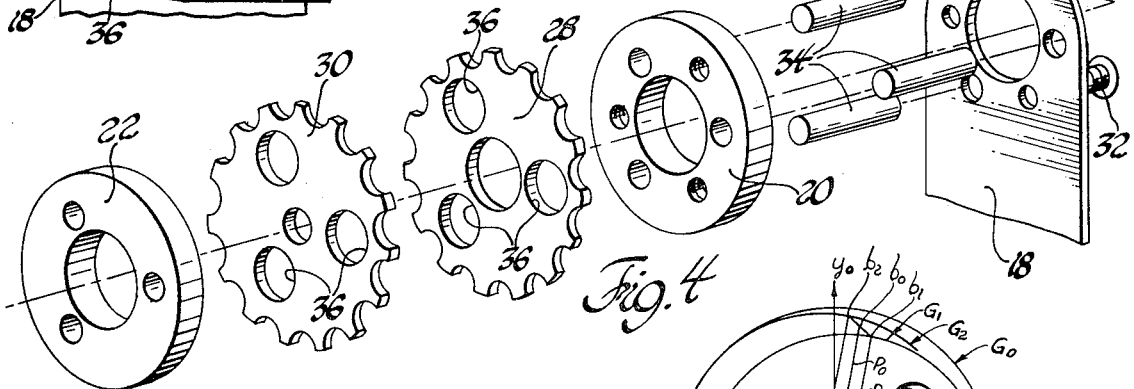
FIG. 4 is an exploded view of the preferred embodiment.

Referring now to the drawings, a drive assembly constructed in accordance with the instant invention is generally shown at 10.

The drive assembly includes a driven member comprising a chain 12. The chain 12 includes a plurality of circular elements 14. The circular elements 14 may take the form of rollers. Alternatively, instead of a chain 12 the driven member may take the form of a circular drum or gear supporting circular elements 14.

The assembly also includes a drive shaft 16. The drive shaft 16 is rotatably supported by a control means comprising a support plate 18. The support plate 18 may be attached to an appropriate support structure. Also included in the control means are the plates 20 and 22.

The shaft 16 has first and second oppositely offset eccentrics 24 and 26. A first drive gear 28 is movably disposed on the first eccentric 24 and a second drive gear 30 is movably disposed on the second eccentric 26.

The plate 20 is attached to the member 18 by the screws 32 which extend through the member 18 and threadedly engage the plate 20.

There is also included guide means comprising the guide pins 34 which extend between and interconnect the plates 20 and 22 and extend through guide holes 36 in the drive gears 28 and 30. The guide pins 34 control the relative rotation between the drive gears 28 and 30.

As the drive shaft 16 is rotated, the drive gears 28 and 30 move in circular orbits about the axis of the shaft 16. As the drive gears 28 and 30 move in orbits about the axis of the shaft 16 they successively engage and disengage the rollers or circular elements 14 of the driven element or chain to move the chain about the axis of the shaft 16.

As alluded to above, an important feature of this invention is the provision of such a drive assembly for driving a driven member employing circular elements which engage the teeth of the drive gears with the shape of the teeth or peripheral contour of the drive gears defined so that the drive gears may be made with relatively large manufacturing tolerances but will operate very efficiently.

Figure 5:
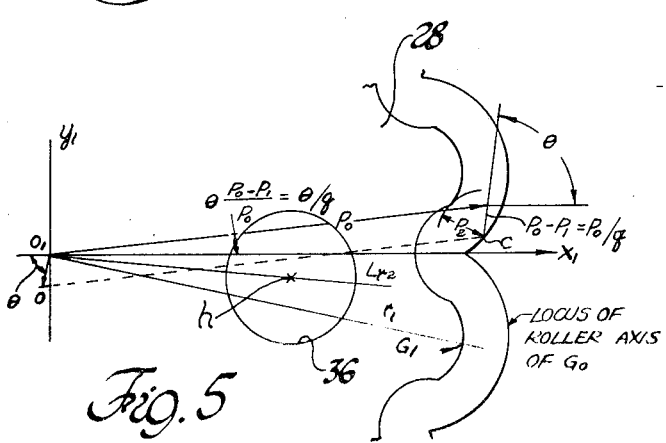
FIG. 5 is a schematic view of one of the drive gears showing the development of the peripheral tooth shape in terms of $x$ and $y$ axes.
Figure 6:
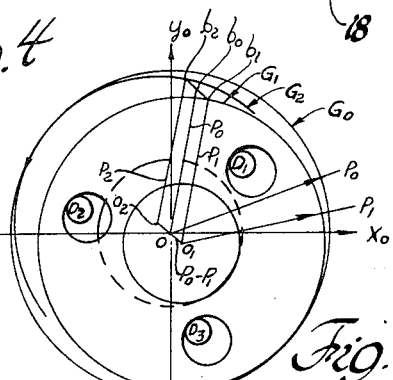
FIG. 6 is a schematic view showing the pitch circles of the various gears.

The shape of the gear teeth on the drive gears 28 and 30 are defined by determining the $x$ and $y$ coordinates of the locus or the arc of movement of the roller 14 axis. A cutter having a radius equal to the radius of the roller elements 14 may be positioned at various positions along the arc to cut the shape of the teeth on the drive gears. The $x$ and $y$ axes pass through the center of the drive gears. FIGS. 5 and 6 illustrate how these $x$ and $y$ coordinates may be calculated. In FIG. 6, $G_1$ represents the pitch diameter of drive gear 28 and $G_2$ represents the pitch diameter of drive gear 30. Also $G_0$ represents the pitch diameter of drive chain 12 or a ring gear. $O_1$ represents the center of drive gear 28 and $O_2$ represents the center of drive gear 30. $O$ represents the center or axis of shaft 16 and the center of a driven gear or member.

$P_0$ is the pitch radius of the driven member. Before calculating the shape of the gear teeth a member to be driven is selected. In other words, the pitch radius $P_0$ for the driven member is known once the driven member is selected.

As the shaft 16 rotates, the center $O_1$ of the gear $G_1$ moves in the circular orbit about the center $O$ of the shaft 16. However, in calculating the tooth shape for the gear $G_1$ the tooth shape is defined in terms of $x$ and $y$ coordinates with the $x$ and $y$ axes passing through the center of the gear $G_1$. Thus, relative to the center $O_1$ of the gear $G_1$ the center $O$ of the driven gear $G_0$ moves in a circular orbit about the center $O_1$ of the gear $G_1$. Such is represented in FIG. 5.

As the gear $G_1$ moves through one complete orbital cycle of positive circular translation, the pitch circumference of the driven gear $G_0$ will advance an amount which is equal to the difference between the pitch circumference of the driven gear $G_o$ and the drive gear $G_1$, it being remembered that the end result is that the driven gear $G_o$ has a uniform rotation or movement which is directly proportional to the rotation of the shaft 16. Thus, the speed ratio or reduction is equal to the difference in the pitch circumference of the driven gear $G_o$ and the drive gear $G_1$ divided by the pitch circumference of the driven gear $G_o$.

Since the pitch radii are proportional to the pitch circumferences of the gears, the speed ratio may also be stated as $$(p_0 - p_1)/p_0 \quad (I)$$

This fraction must be rational and in the practical sense is the reciprocal of an integer. In the practical case $$(p_0 - p_1)/p_0 = 1/q \quad (II)$$

where $q$ is the number of teeth on the driven gear $G_0$ and $q-1$ is the number of teeth on the driving gears $G_1$ and $G_2$.

Again, to calculate the tooth shape for $G_1$ a fixed coordinate system is established in the driving gear $G_1$ which coordinate system has $x$ and $y$ axes passing through the center $O_1$ of the gear $G_1$.

As shown in FIG. 6, the distance between the center $O_1$ of the gear $G_1$ and the center $O$ of the gear $G_o$ is the difference in the pitch radii, $p_0 - p_1$. As established above, the speed ratio between $G_1$ and $G_0$ is $1/q$. Therefore, if the gear $G_1$ rotates an angle $\Theta$ the gear $G_o$ rotates an angle $\Theta/q$. This is exemplified in FIG. 5 wherein the gear $G_1$ has rotated an angle $\Theta$ remembering, however, that the coordinates $x$ and $y$ are relative to the gear $G_1$. Since the coordinates $x$ and $y$ are fixed relative to the gear $G_1$ the center $O$ of the gear $G_o$ is at an angle $\Theta$ relative to the $x$ axis. Also represented is the rotational movement of the gear $G_o$ which is the angle $\Theta/q$. From FIG. 6 it will be noted that the lines connecting the center $O$ with the drive gear centers $O_1$ and $O_2$ rotate about the center $O$. In a similar fashion, a point $b_1$ on the pitch circle of gear $G_1$ will move in an orbit about a fixed point located on the pitch circle of gear $G_0$. In a similar manner, point $b_2$ on the pitch circle of gear $G_2$ moves in orbit about point $b_0$. However, relative to a point fixed in gear $G_0$ the motion is completed by the rotation of $G_0$. As stated above, for movement of gear $G_1$ through an angle $\Theta$, driven member of gear $G_o$ rotates an angle $\Theta/q$. Thus $p_0$ is drawn from center $O_1$. From the end of $p_0$, a line equal to the length of $p_0 - p_1$ is drawn parallel to the line connecting $O_1$ to establish a point on the locus of the axes of the circular elements 14 in the driven member. $p_2$ is the radius of the circular elements 14 and as the origin of radius $p_2$ moves along the locus or arc of movement of the center of the rollers it defines the shape of the teeth on the gear $G_1$. Thus, if a circular cutter is positioned at spaced points along the arc or locus of the roller centers, it will cut teeth in gear $G_1$ having the desired shape. Of course, the gear $G_2$ has the same tooth shape as gear $G_1$.

To define a point on the locus or arc of movement of the center of the rollers about which the radius $p_2$ is drawn in terms of the $x$ and $y$ axes, a projection of the point is made upon the $x$ and $y$ axes respectively. By trigonomic functions, the $x$ position of the that point which is labeled as $c$ in FIG. 5 is $$x = p_0 \left( \cos \frac{\theta}{q} - \frac{1}{q} \cos \theta \right) \quad (III)$$

and the projection on the $y$ axis is $$y = p_0 \left( \sin \frac{\theta}{q} - \frac{1}{q} \sin \theta \right) \quad (IV)$$

In order to cut the desired tooth contour in the gears $G_1$ and $G_2$ a circular cutting gear may be disposed at various points C along the locus or arc of movement of the center of the rollers. In order to accomplish this, the locus or arc is divided into a number M, of lengths and the cutting tool is positioned at these various steps or positions. To this end, the derivative of the $x$ coordinate with respect to the angle $\Theta$ is $$\begin{aligned}\frac{dx}{d\theta} &= \frac{p_0}{q} \left( -\sin \frac{\theta}{q} + \sin \theta \right) \\ &= \frac{p_0}{q} \left( 2 \sin \frac{1}{2}\left(\theta - \frac{\theta}{q}\right) \cdot \cos \frac{1}{2}\left(\theta + \frac{\theta}{q}\right) \right) \\ &= 2 \frac{p_0}{q} \sin \theta \frac{q-1}{2q} \cdot \cos \theta \frac{q+1}{2q} \end{aligned} \quad (V)$$

similarly the derivative of the $y$ coordinate with respect to the angle $\Theta$ is:

$$\frac{dy}{d\theta} = 2 \frac{p_0}{q} \sin \theta \frac{q-1}{2q} \cdot \sin \theta \frac{q+1}{2q} \quad (VI)$$

The derivative of arc length along the locus of the roller center with respect to $\Theta$ is $$\begin{aligned}\frac{ds}{d\theta} &= \left( \left(\frac{dx}{d\theta}\right)^2 + \left(\frac{dy}{d\theta}\right)^2 \right)^{\frac{1}{2}} \\ &= 2 \frac{p_0}{q} \left( \sin^2 \theta \frac{q-1}{2q} \cdot \cos^2 \theta \frac{q+1}{2q} + \theta \frac{q-1}{2q} \cdot \sin^2 \theta \frac{q+1}{2q} \right)^{\frac{1}{2}} \\ &= 2 \frac{p_0}{q} \sin \theta \frac{q-1}{2q} \end{aligned} \quad (VII)$$

so the arc length is $$\begin{aligned} S &= 2 \frac{p_0}{q} \int_0^\theta \sin \theta \frac{q-1}{2q} d\theta \\ &= 4 \frac{p_0}{q-1} \left( 1 - \cos \theta \frac{q-1}{2q} \right) \end{aligned} \quad (VIII)$$

Since there are fewer teeth ($q-1$) on $G_1$ than there are teeth ($q$) on $G_0$, one complete revolution of the shaft will not quite replace one roller of $G_0$ with another. To replace one roller of $G_0$ with another the shaft must rotate through an angle.

$$\Theta = (q/q-1)2\pi \quad (IX)$$

The angle of shaft rotation which will move a roller of $G_0$ from throat to crown of $G_1$ is therefore $$\Theta = (q/q-1)\pi \quad (X)$$

By substitution in (VIII) the arc length traced by the axis of a roller of $G_0$ in moving from throat to crown of $G_1$ is $$S_t = 4(p_0/q-1) \quad (XI)$$

This arc length is divided into a plurality of equal lengths M so that the cutter may be positioned at various steps along the arc of the locus of the centers of the rollers 14. The number of lengths into which the arc length is divided is M and N represents the number of the step length in which the cutting tool will be positioned. By dividing the total arc into a number of lengths M, the angle $$\theta = \frac{2q}{q-1} \operatorname{acos}\left( 1 - \frac{N}{M} \cdot \frac{q-1}{4p_0} \right) \quad (XII)$$

By substituting this value for Θ into the formulas (III) for $x$ and (IV) for $y$ we obtain $$x = p_0 \left[ \cos \frac{\frac{2q}{q-1} \operatorname{acos} 1 - \frac{N}{M}}{q} - \frac{1}{q} \cos \left( \frac{2q}{q-1} \operatorname{acos} \left( 1 - \frac{N}{M} \right) \right) \right]$$

$$y = p_0 \left[ \sin \frac{\frac{2q}{q-1} \operatorname{acos} 1 - \frac{N}{M}}{q} - \frac{1}{q} \sin \left( \frac{2q}{q-1} \operatorname{acos} \left( 1 - \frac{N}{M} \right) \right) \right]$$

The immediately above formulas are the expressions for the coordinates $x$ and $y$ for any step or position in which the cutting tool is placed where $N$ is the number of the step where there are $M$ number of equal arc lengths. $p_0$ is the pitch radius of the driven member engaged by the teeth of the gear $G_1$ and $q$ is the number of teeth in the driven member and is also the ratio of the gearing.

To illustrate the fact that the gear design allows for manufacturing tolerances, calculate the derivative of the $y$-coordinate of the roller center with respect to the $x$-coordinate from the parametric derivatives given in (V) and (VII).

$$dy/dx = \tan \Theta(q + 1/2q) \quad \text{(XIII)}$$

At $\Theta = 0$, when a roller of $G_0$ is fully engaged in a throat of $G_1$, $dy/dx = 0$. Thus, when a roller (14) lifts from a throat of $G_1$ (borne on a crown of $G_2$) it moves out radially and is disengaged from $G_1$.

Contact with the crown of $G_1$ will be regained when the tip of a vector of length $p_2$ normal to the arc followed by the roller center lies on the surface occupied by a roller at $\Theta = 0$. After contact has been regained, the roller will lie in the shallow corner formed by the crowns of $G_1$ and $G_2$ so that a very small radial clearance will suffice to permit the gearing to accommodate pitch errors even if the rollers of $G_0$ are carried in a rigid member. If $q$ is odd there will never be an occasion when two rollers of $G_0$ are fully engaged. This is the preferred arrangement.

So long as the shaft angle $\Theta_c$ at which a roller engages the crown of a tooth meets the condition $$\theta_0 \leq \frac{\pi}{2} \frac{q}{q-1} \quad \text{(XIV)}$$

each roller is in contact with at least one tooth and at least half will be in contact with two teeth. With the constraint supplied by the fixed pitch distance of a roller chain, the roller centers will travel on a circular arc while in contact with $G_1$ and/or $G_2$ and the translation of the chain along the arc is $$p_0 \left( \frac{\theta}{q} + \theta_d \frac{q-1}{q} \right) \quad \text{(XV)}$$

where $\Theta_d$ is the rotation of the pins. Thus, the gearing is a differential speed reduction drive.

Similarly, $G_0$ may consist of a circular array of cylindricals pins mounted in a rigid member. In this case, that member is supported by the gearing coaxially with the high speed shaft. Not all of the pins need be present. Where $q=21$ and $G_0$ consists of a cage of seven pins, a very practical arrangement is provided.

A further feature of the instant invention is the positioning of the holes 36. As best referred to in FIG. 5, the hole 36 has a center $h$. The center $h$ of the guide hole 36 is disposed on the bisector of two radials. One of the radials $r_1$ extends through the center of a tooth and the other radial $r_2$ extends through the center of the throat or root adjacent to that tooth. As illustrated in FIG. 5, the radial $r_2$ coincide with the $x$ axis. The gears are then marked or provided with an indicia to indicate one face of the gear relative to the guide hole 36. By placing such an indicia on the gears when they are manufactured, two gears $G_1$ and $G_2$ may be placed in the assembly with the marks on given faces facing outwardly. In other words, all of the drive gears are manufactured so as to have the same peripheral tooth configuration but any two given gears in an assembly are mirror images of one another and are placed back to back.

The embodiments of the invention in which an exclusive property or privilege is claimed are defined as follows:

1. A gear of the type utilized in a drive assembly having at least two such gears disposed on offset eccentrics for engaging a member having circular elements to engage the gears, said gear having a peripheral contour defined from the center of the gear by the coordinates $$x = p_0 \left[ \cos \frac{\frac{2q}{q-1} \operatorname{acos} 1 - \frac{N}{M}}{q} - \frac{1}{q} \cos \left( \frac{2q}{q-1} \operatorname{acos} \left( 1 - \frac{N}{M} \right) \right) \right]$$

$$y = p_0 \left[ \sin \frac{\frac{2q}{q-1} \operatorname{acos} 1 - \frac{N}{M}}{q} - \frac{1}{q} \sin \left( \frac{2q}{q-1} \operatorname{acos} \left( 1 - \frac{N}{M} \right) \right) \right]$$

where: $p_0$ is the pitch radius of the member to be engaged and driven by the teeth; $q$ is the number of teeth in the driven member and is also the ratio of the gearing; $M$ is the number of lengths into which the arc of movement of the circular elements is divided; and $N$ is the number of the length.

2. A gear as set forth in claim 1 including a plurality of guide holes extending through the gear about the center thereof, at least one guide hole having a center disposed on a bisector of two radials one of which extends through the center of a tooth and the other of which extends through the center of the root adjacent to said tooth.

3. In a drive assembly of the type for driving a driven member with a plurality of circular elements and including a shaft having first and second eccentrics with a first gear movably disposed on said first eccentric and a second gear movably disposed on said second eccentric adjacent said first gear and control means outwardly of said gears and guide means supported by said control means and extending through said gears for controlling the relative rotation between said gears, the improvement comprising said first and second gears having peripheral contours defined from the respective centers thereof by the coordinates $$x = p_0 \left[ \cos \frac{\frac{2q}{q-1} \mathrm{acos}\, 1 - \frac{N}{M}}{q} - \frac{1}{q} \cos\left(\frac{2q}{q-1} \mathrm{acos}\left(1 - \frac{N}{M}\right)\right) \right]$$

$$y = p_0 \left[ \sin \frac{\frac{2q}{q-1} \mathrm{acos}\, 1 - \frac{N}{M}}{q} - \frac{1}{q} \sin\left(\frac{2q}{q-1} \mathrm{acos}\left(1 - \frac{N}{M}\right)\right) \right]$$

where: $p_0$ is the pitch radius of the driven member, $q$ is the number of teeth on the driven member and is also the ratio of the gearing, $M$ is the number of lengths into which the arc of movement of the circular elements is divided, and $N$ is the number of the length.

4. In an assembly as set forth in claim 3 wherein each gear includes a plurality of guide holes extending therethrough about the center thereof through which said guide means extend, at least one guide hole having a center disposed on a bisector of two radials one of which extends through the center of a tooth and the other of which extends through the center of the root adjacent to said tooth.

* * * * *

UNITED STATES PATENT OFFICE
CERTIFICATE OF CORRECTION

Patent No. 3,710,635    Dated January 16, 1973

Inventor(s) Richard M. Whitehorn

It is certified that error appears in the above-identified patent and that said Letters Patent are hereby corrected as shown below:

Column 5, line 3 (Specification, page 8, line 6)

$$" \; x = P_0 \left[ \cos \frac{\frac{2q}{q-1} a\cos 1 - \frac{N}{M}}{q} - \frac{1}{q} \cos \left( \frac{2q}{q-1} a\cos \left(1 - \frac{N}{M}\right) \right) \right] \; "$$

Should be
$$-- \; x = P_0 \left[ \cos \frac{\frac{2q}{q-1} a\cos 1 - \frac{N}{M}}{q} - \frac{1}{q} \cos \left( \frac{2q}{q-1} a\cos \left(1 - \frac{N}{M}\right) \right) \right] \; --.$$

Column 6, line 38 (Claim 1, line 6)
$$x = P_0 \left[ \cos \frac{\frac{2q}{q-1} a\cos 1 - \frac{N}{M}}{q} - \frac{1}{q} \cos \left( \frac{2q}{q-1} a\cos \left(1 - \frac{N}{M}\right) \right) \right]$$

should be
$$-- \; x = P_0 \left[ \cos \frac{\frac{2q}{q-1} a\cos 1 - \frac{N}{M}}{q} - \frac{1}{q} \cos \left( \frac{2q}{q-1} a\cos \left(1 - \frac{N}{M}\right) \right) \right] \; --.$$

Column 6, line 39 (Claim 1, line 7)
$$" \; y = P_0 \left[ \sin \frac{\frac{2q}{q-1} a\cos 1 - \frac{N}{M}}{q} - \frac{1}{q} \sin \left( \frac{2q}{q-1} a\cos \left(1 - \frac{N}{M}\right) \right) \right] \; "$$

should be
$$-- \; y = P_0 \left[ \sin \frac{\frac{2q}{q-1} a\cos 1 - \frac{N}{M}}{q} - \frac{1}{q} \sin \left( \frac{2q}{q-1} a\cos \left(1 - \frac{N}{M}\right) \right) \right] \; --.$$

Column 7, line 4 (Claim 3, line 12)
$$" \; x = P_0 \left[ \cos \frac{\frac{2q}{q-1} a\cos 1 - \frac{N}{M}}{q} - \frac{1}{q} \cos \left( \frac{2q}{q-1} a\cos \left(1 - \frac{N}{M}\right) \right) \right] \; "$$

should be
$$-- \; x = P_0 \left[ \cos \frac{\frac{2q}{q-1} a\cos 1 - \frac{N}{M}}{q} - \frac{1}{q} \cos \left( \frac{2q}{q-1} a\cos \left(1 - \frac{N}{M}\right) \right) \right] \; --.$$

Column 7, line 5 (Claim 3, line 13)
$$" \; y = P_0 \left[ \sin \frac{\frac{2q}{q-1} a\cos 1 - \frac{N}{M}}{q} - \frac{1}{q} \sin \left( \frac{2q}{q-1} a\cos \left(1 - \frac{N}{M}\right) \right) \right] \; "$$

should be
$$-- \; y = P_0 \left[ \sin \frac{\frac{2q}{q-1} a\cos 1 - \frac{N}{M}}{q} - \frac{1}{q} \sin \left( \frac{2q}{q-1} a\cos \left(1 - \frac{N}{M}\right) \right) \right] \; --.$$

Signed and sealed this 20th day of November 1973.

(SEAL)
Attest:

EDWARD M. FLETCHER, JR.
Attesting Officer

RENE D. TEGTMEYER
Acting Commissioner of Patents